May 5, 1959  B. C. DOUGLAS  2,885,150
GAS CONTROL AND SAFETY VALVE
Filed March 8, 1956  2 Sheets-Sheet 1

Bradley C. Douglas,
Inventor.
Koenig and Pope,
Attorneys.

May 5, 1959 B. C. DOUGLAS 2,885,150
GAS CONTROL AND SAFETY VALVE
Filed March 8, 1956 2 Sheets-Sheet 2

Bradley C. Douglas,
Inventor.
Koenig and Pope,
Attorneys.

United States Patent Office 2,885,150
Patented May 5, 1959

2,885,150

GAS CONTROL AND SAFETY VALVE

Bradley C. Douglas, Kirkwood, Mo., assignor to Food Giant Markets, Inc., a corporation of New Jersey Application March 8, 1956, Serial No. 570,290

2 Claims. (Cl. 236—1)

This invention relates to gas control and safety valves, and with regard to certain more specific features, to such valves for burners of cooking ranges and the like.

Among the several objects of the invention may be noted the provision of a combination gas control and safety valve structure for a range burner or burners having a pilot light or lights, which combination may be easily adapted to various burner and pilot arrangements; the provision of a combination of this class permitting convenient preparation of a range for a safe temperature-controlled "on" operating condition, and also for a safe "off" condition; the provision of a combination of the class described permitting the convenient return of certain manual control means from an "on" to an "off" position; and the provision of a combination of said class which is of compact and low-cost construction. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is an axial section of the device, being taken on line 1—1 of Fig. 2;

Fig. 9 is a diagrammatic view showing the relationship between certain control and controlled elements.

Corresponding reference characters indicate corresponding parts throughout the several views of the drawings.

Figure 1:
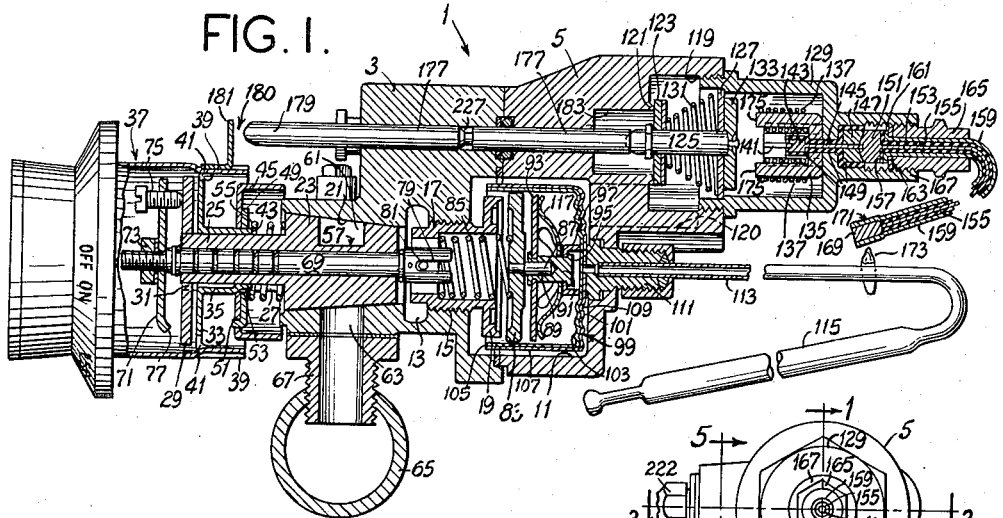
Figure 4:
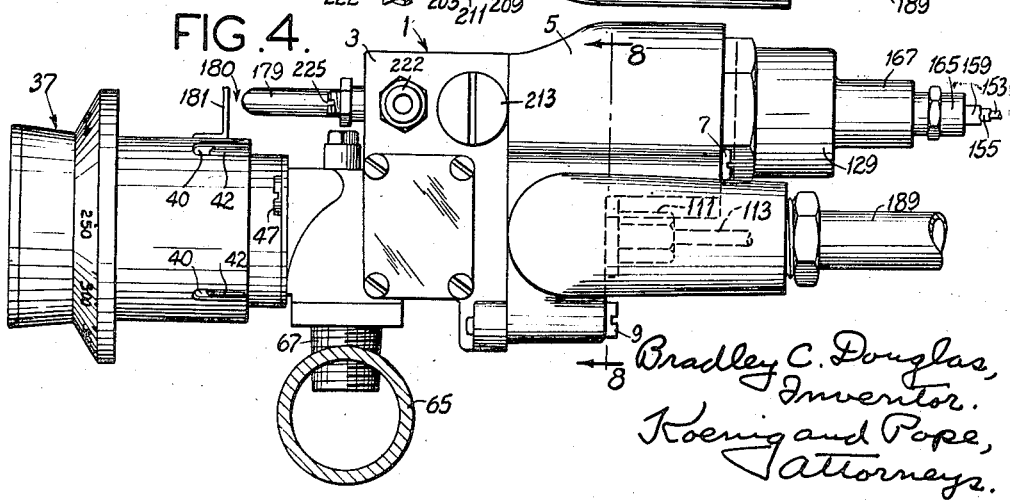
Fig. 4 is a side elevation of the device.

Referring now to the drawings, numeral 1 shows a main body made up of two parts 3 and 5 joined by means of fasteners 7 and 9. Parts 3 and 5 are formed cooperatively to provide a compartment 11. Part 3 contains a passage 13 which is threaded at one end, as shown at 15, for the reception of a threaded tubular portion 17 of an adjustable annular valve seat 19 in compartment 11. At its opposite end, the passage 13 is of a conical shape 21 forming a seat for a conical plug valve 23. Valve 23 has a tubular front stem 25 which is slotted as shown at 27 and carries a calibration plate 29 keyed into said slot, as indicated at 31. It also carries a cup 33 having an inner sleeve 43, keyed into the slot 27 (see key 35). A control knob assembly 37 fits removably but snugly with friction on the outside of cup 33. The knob assembly 37 has inwardly struck keys 39 fitting into slots 41, driving slots 40 fitting with lugs 42 on the cup 33, and a dimple stop 44 engaging the face of cup 33. The dimple limits sliding application of knob assembly 37 on cup 33 and effects a push drive from the assembly to the cup after application of the former to the latter. Thus when the knob assembly 37 is frictionally attached, as shown in Figs. 1 and 4, it may be used to turn the cup 33, due to keys 39, or to push the cup axially toward body 1, the cup having the sleeve 43 keyed to but slidable on the hollow stem 25. The sleeve 43 extends into a cup 45 which is affixed to the part 3 by fasteners 47 (see Figs. 4 and 7).

Inside the fixed cup 45 is a ring 49 having a lug 51 movable into and out of an opening in the said cup 45. The opening is only slightly larger than the lug. A stepped portion 53 on key 35 is adapted to force the ring 49 to the right (Fig. 1) when the knob assembly 37 and cup 33 are pushed to the right. This occurs against the bias of a spring 55 reacting from the plug valve 23 at one end and against the ring 49 at the other end. Thus when the knob assembly 37 is pushed in, the lug 51 is driven out of its opening in the fixed cup 45 and thereafter is rotatable along with the knob assembly 37, movable cup 33 and valve 23. When the knob assembly 37 is returned to its initial angular position, the lug 51 is biased into its opening in the fixed cup 45 by action of spring 55. This returns the assembly 37 to its initial axial position. Thus the assembly 37 and valve 23 may be locked in an initial angular position and unlocked for rotary movement by slightly pushing in assembly 37 from its initial axial position.

The valve 23 is provided with a port 57 having an axial sidewise slotted portion 59 and a connected peripheral slotted portion 61, formed so that, upon initial turning of the knob assembly 37 from the locked position, a connection is immediately made with an inlet 63 in body 3. The connection is maintained upon further turning of the assembly 37. The inlet is supplied from a gas manifold 65 through a connection 67. Thus when the knob assembly 37 is initially pushed in and turned a little from the locked position, the valve 23 forms a connection with the inlet port 63 and thereafter maintains it throughout additional rotary adjustments for temperature control, as indicated by indicia on the knob assembly.

The knob assembly 37 may be axially pulled and removed from the movable cup 33, having the stated frictional sliding fit therewith. This exposes the front end of a calibration stem 69 to which is threaded a plate 71, locked by a jamb nut 73. One or more lock screws 75 are threaded through the plate 71 for engagement with the plate 29, one screw being shown. Plate 71 carries a pointer 77 for pointing to suitable calibration indicia on the front of plate 29. Thus by loosening the lock screw or screws 75, the stem may be turned with respect to the valve 23. After an adjustment is made, the lock screw or screws 75 are reset, so that the valve 23 and stem 69 again turn as an assembly. After any adjustment, the knob assembly 37 may be replaced on the movable cup 33. The adjustment provides for calibration.

The inner end of the stem 69 is forked, as shown at 79, for cooperation with a cross pin 81 in the tubular portion 17 of valve seat 19. It is therefore apparent that any angular adjustments effected by the calibration stem 69, relative to the valve 23 or with it, result in changing the distance that the valve seat 19 extends into the compartment 11. When the stem 69 is nonadjustably locked up with the valve 23, the tubular portion 17 rotates with the valve while threading in and out to vary the position of the valve seat 19 over a given range. Briefly, then, the rotary movement of the knob assembly 37 not only opens the gas supply valve 23 but changes the axial position of the valve seat 19 over a range; whereas any calibrating adjustment of the stem 69 relative to valve 23 changes the location of the range.

In compartment 11 there is shown at 83 a valve disc which is biased away from the seat 19 by means of compression coil spring 85. Disc 83 is located on a stem 87, placed in a socket 89 of a button 91. At its left end, the button is riveted to a plate 93 and at its right end it has a head 95 movable in a socket of a cup 97. Cup 97 is attached to the inside of a bimetallic thermostatic compensating cup 99. This has outer and inner members 101 and 103 composed of different metals having different coefficients of expansion. These are joined as by welding exclusively along the rim 105; otherwise these members are separate. The cylindrical portions 107 of the cup 99 are uncorrugated, whereas its circular bottom portions 109 are corrugated. The inner member 103 is composed of a metal having a low coefficient of expansion relative to that of the outer member 101. A satisfactory material for member 103 is Invar, which has a coefficient of expansion which is substantially zero. A suitable material for the outer member is a chrome-nickel-iron alloy. The center of the outer member 101 is attached to a coupling 111 for a bendable metal tube 113 which extends to a suitable temperature-detecting bulb 115. The bulb 115 and tube 113 are filled with a suitable liquid which expands in accordance with the temperature increase at the bulb 115 and contracts with temperature reduction. Thus liquid is forced to and from the cup 99. When forced to the cup, the members 101 and 103 tend to separate, particularly in the corrugated bottom portion 109, thus driving the member 97 (which slides on 91) against a multi-fingered spring 117. This forces the thermostatic control valve 83 to the left and toward valve seat 19. This results in a reduction in the amount of gas flowing out of the seat 19 in any given adjusted position of the seat. The purposes of the spring 117 is to permit additional movement of member 97 relative to button 91, after seating of the valve 83, as may be caused after valve control movement by continued temperature rise in the space being heated (oven, for example). Thus this arrangement compensates for so-called temperature "overshoot," as well as regulating temperature.

It will be understood that the ambient temperature in the compartment 11 will usually not be the same as that around in the bulb 115, and that this ambient temperature may vary. The bimetallic nature of the cup members 101, 103 is for the purpose of compensating for such changes without affecting the movement of the valve 83. Thus if the temperature rises in the compartment 11, the outer wall of the cylindrical portion 107 (being of a higher coefficient of expansion than that of the inner wall) will separate from the inner wall, so that compensating space is provided for any of the expansion of the liquid in the cup due to the rise in temperature in compartment 11. Therefore, the valve 83 is regulated substantially exclusively in accordance with the temperature of the bulb 115 and independently of temperature changes in the compartment 11.

Figure 3:
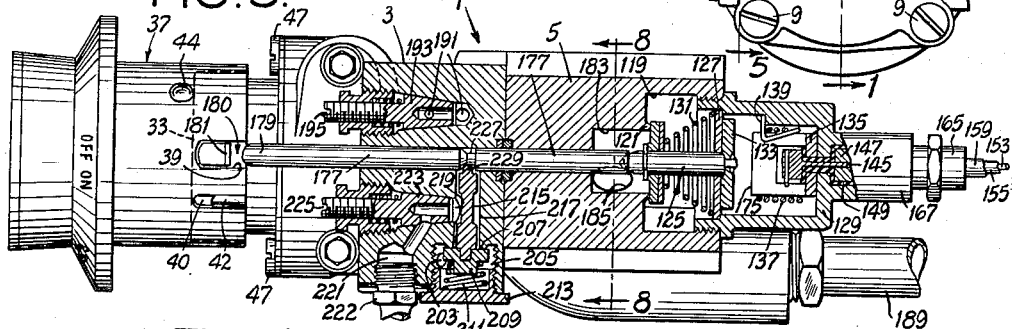
Fig. 3 is a horizontal section taken on line 3—3 of Fig. 2.

The upper portion of the part 5 of body 1 is formed with a compartment 119 having a seat 121 around the end of a connected compartment 183. Compartment 119 is connected with compartment 11 by passage 120. Valve disc 123 bears on seat 121. Disc 123 is located on a valve stem 125 which passes slidably through an opening in a guide plate 127. The latter is fixed on a shoulder on the inside of a cup 129 threaded to part 5. A spring 131 normally biases the valve 123 to its seat 121, the spring reacting against the fixed plate 127. Beyond the plate 127, the stem is provided with a magnetizable head or armature (iron, for example) 133. At 135 is shown a two-pole (horseshoe) magnet which is held to the inside bolttoms of the cup 129. The poles 175 of this magnet carry series windings 137. One end 139 of the series windings is grounded to member 129, as shown in Fig. 3. The other end 141 of the series windings is in conductive engagement with a lead slug 143, which in turn is attached to a wire 145 connected to a conductive socket-forming slug 147. Insulation 149 separates the conductive parts 143, 145 and 147 from member 129. A conductive plug is shown at 151 attached to a wire 153 located within an insulating tube 155 having an insulating flange 157. Surrounding the insulating tube 155 is a metal tube 159, flanged as shown at 161. The flange 161 is backed by a conductive washer 163. A metal bushing 165, threaded into a threaded extension 167 of member 129, is adapted to hold the plug 151 in electrical engagement with the socket member 147. The wire or core 153 extends to a head 169. The tube 159 also extends to this head 169 and therewith makes a bimetallic electromotive junction or thermocouple, indicated in general by the numeral 171.

The different metals composing parts 153 and 159 are appropriately chosen from the electromotive series of metals, so as to form the desired thermocouple at 169, 171. For example, one may be iron and the other iron-nickel alloy. The junction 169, 171 is placed in heat-exchange relation with the pilot flame 173. The latter is adapted to light whatever burner or burners are served by the apparatus, as, for example, oven burners in the oven in which bulb 115 is located. When the pilot 173 is ignited, the electromotive force generated at the junction 171 sends a current through the wire core 153, plug 151, socket 147, wire 145, series windings 137, members 129, 165, outer tube 159 and back to the junction 171. The windings generate an attractive magnet field at the faces of poles 175 of the magnet 135. This has insufficient attraction across the large air gap at the pole faces to draw over the armature 133. But the attraction is sufficient that at zero air gap the armature will be held against the electromagnet against bias of the spring 131. When the pilot 173 is extinguished, cooling of the thermocouple 169, 171 reduces the electromotive force and current flowing, thus releasing the armature 133 under action of spring 131.

In order to push the armature 133 against the electromagnet 135, a passage is provided through members 3 and 5 slidably to accommodate a push rod 177, the end of which engages the valve stem 125. The forward end 179 of this push rod ends adjacent to a cam 181 extending from the control knob assembly 37, with some clearance indicated at 180. This clearance is equal to the amount of motion required to force the lug 51 from the opening in 45 when the knob assembly 37 is pushed to the right (Fig. 1). Thus when the knob assembly 37 is pushed from its initial axial and rotatary position axially to the right (Fig. 1), the clearance 180 is first taken up to permit unlocking of the lug 51 from member 45. Further axial movement forces the rod 177 against the valve stem 125, thus opening valve 123 and placing the armature 133 against the poles 175 of the electromagnet 135 with zero air gap. If the pilot 173 is burning, with electromotive force being generated at the thermocouple 171, the armature 133 will be held against the magnet, even though the knob assembly 37 is permitted to return to its initial position, or any other intermediate position (short of locking at 51) wherein it may be turned for adjusting the gas cut-off valve 23. Thus the valve 123 is held open regardless of any subsequent retraction of the cam 181 from the end of the rod extension 179, provided the coils 137 are excited.

It will be apparent from Fig. 3 that if the knob assembly 37 has been turned to take the cam 181 out of the line of rod extension 179, and the armature 133 becomes released (pilot 173 extinguished), the knob assembly 37 may be returned to its initial rotary position without the extension 179 interfering with the necessary return rotation. When the knob assembly returns to its initial rotary position, the clearance 180 becomes reestablished because spring 55 presses the locking lug 51 into its opening in member 45. This forces the knob assembly back to its initial axial, as well as its initial rotary position.

Figure 2:
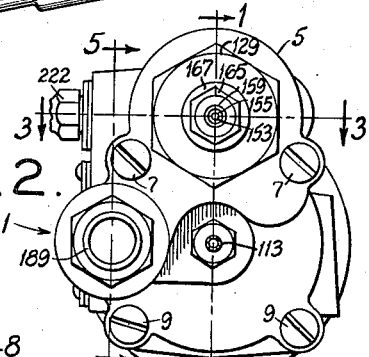
Fig. 2 is a right-hand (rear-end) elevation of the device as shown in Figs. 1 and 4.

The path of gas from the manifold 65 to the heating burner served by the apparatus (assuming valve 23 to be open) is through the connections 67, 63, valve port 57, passage 13, hollow valve tube 17, past valve seat 19 (assuming theremostatic control valve 83 to be open), compartment 11, passage 120 compartment 119, past valve 123 (assumed to be open) into chamber 183, then through a cross passage 185 (Fig. 8) to an outlet passage 187. A pipe 189 (Figs. 2 and 4) is connected to the outlet passage 187 and leads to the burner. Obviously, if the valve 123 is closed, this gas path is blocked, regardless of the open or closed positions or adjustments of the gas supply valve 23 and the thermostatic control valve 83.

Figure 6:
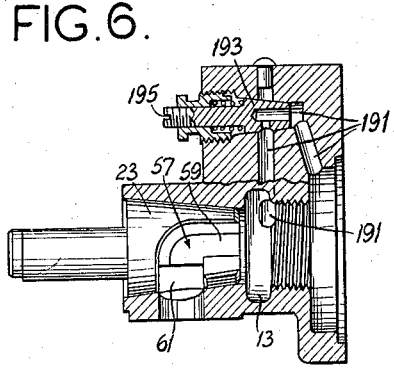
Fig. 6 is a fragmentary vertical stepped section taken on line 6—6 of Fig. 7.

At low fuel consumption rates a condition may occur wherein the valve 83 seats and entirely cuts off gas to the burner (even assuming valve 23 to be open). This is undesirable since it interferes with smooth thermostatic control action in the low-temperature range. In order to prevent this, the port arrangement shown in Fig. 6 is employed, wherein the passage 13 has a jogged connection 191 with space 11 which by-passes the valve seat 19. In this jogged connection is a ported spring-pressed hollow rotary plug valve 193, adapted to be adjusted from a screw driver slot 195 for supplying minimum gas from manifold 65 to the outlet 189 for a minimum flame when the valve 83 is shut (valves 23 and 123 open).

Figure 5:
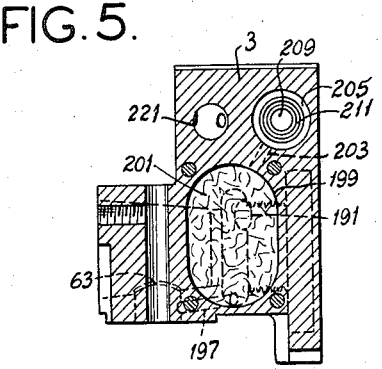
Fig. 5 is a fragmentary vertical section taken on line 5—5 of Fig. 2.
Figure 8:
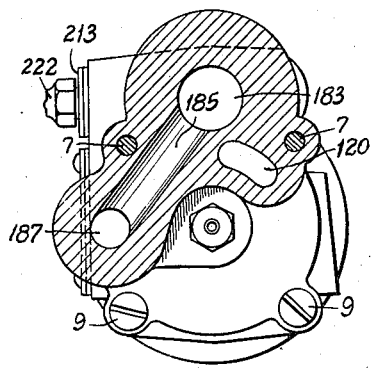
Fig. 8 is a vertical section taken on line 8—8 of Figs. 3 and 4.

In order to supply gas to the pilot 173, the porting shown in Figs. 3, 5 and 8 is employed. Referring to Fig. 5, numeral 197 shows a take-off port from port 63 which leads to a filter compartment 199 in which is a replaceable filter cartridge 201. Outlet 203 from this filter compartment leads to a capped compartment 205 (Fig. 3), the bottom of which forms a valve seat 207. A valve 209 is held to this seat by a spring 211, reacting against the threaded cap 213 of compartment 205. At 215 is shown a valve stem extending through a passage 217. This stem is guided in the passage but has some side clearance so as to permit gas flow from valve 209. An outlet 219 from passage 217 leads to an opening 221 into which is threaded a pipe 222 leading to the pilot 173. A spring-pressed ported control plug valve 223 in the outlet 219, adapted to be rotated from a screw driver slot 225, serves to control gas bled to the pilot 173 when the valve 209 is open. It is important that the filter cartridge 201 be located ahead of the control valve 223, inasmuch as this valve is usually finely adjusted to a small port opening for proper functioning of the pilot 173 and any clogging due to foreign material would have large effects. This filter is not in the path of gas through the adjusting control valve 193 in the by-pass 191 because the adjusted porting of this valve 193 is larger and foreign material does not have such large effects.

The valve 209 is adapted to be opened when the stem 177 is pushed in, to the point where the armature 133 seats against the magnet poles 175. This is accomplished by providing in stem 177 a beveled groove 227 with which cooperates a nose 229 on the valve stem 215. Thus when the knob assembly 37 is pushed in, not only is the main safety valve 123 opened, but also the pilot safety valve 209.

Figure 7:
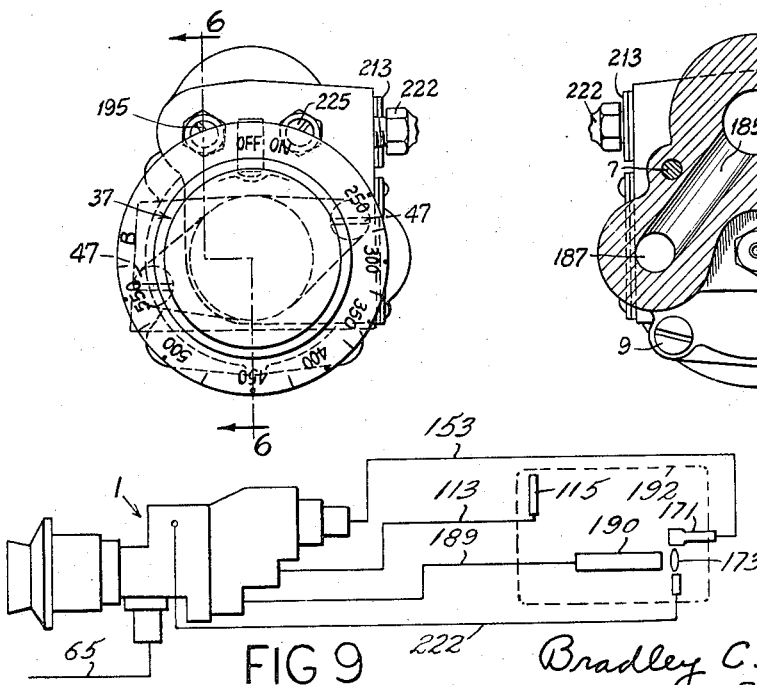
Fig. 7 is a left-hand (front-end) elevation of the device as shown in Figs. 1 and 4.

Operation is as follows:
Assume that the knob assembly 37 is turned clockwise as far as possible to its "off" position, as shown in Fig. 7. To prepare the range for operation of the pilot 173, the knob assembly is pushed straight in to the right (Figs. 1 and 4) as far as it will go, which places the armature 133 against the poles 175 of the electromagnet 135. The valve 23 is at this time closed. Therefore, no gas flows to the main burner indicated at 190 in the heating space 192 at the end of pipe 189. Gas can and does flow to the pilot 173 at the end of pipe 222, because at this time the beveled groove 227 of rod 177 has pushed aside the nose 229 of valve stem 215. This opens the pilot safety valve 209. The pilot 173 is then ignited by a match or the like, while holding in the knob assembly 37 until the thermocouple 169, 171 generates enough electromotive force to supply sufficient current to the electromagnet 135 to hold armature 133 against its poles 175. Thereafter the knob assembly 37 may be released. The armature will then adhere to the poles 175 as long as the pilot 173 is ignited. The range is then in condition for operation.

To turn on the main burner at the end of pipe 189, knob assembly 37 is held in an inwardly pushed position sufficient to have removed lug 51 from its locked position with member 45. Thereafter the knob assembly 37 may be turned anticlockwise (Fig. 7) to its various "on" positions. The space heated by the burner at the end of pipe 89 being cold, valve 83 is open. Since now the gas supply valve 23, the thermostatic control valve 83, and the main safety valve 123 are all open, gas may flow from the manifold 65 to the burner at the end of pipe 189 via 67, 63, 13, 17, 11, 120, 119, open safety valve 123, 183 (Figs. 1 and 8), 185, 187 to pipe 189 and the burner at its end. As the oven or other space heated by the burner warms up, the bulb 115 increases in temperature, thus expanding the liquid in tube 113 and tending to close the thermostatic control valve 83. At some position of approach of valve 83 toward seat 19, substantially steady-state conditions will be reached. If any overshoot should occur, closing valve 83, gas by-passed around closed valve 83 reaches the burner in minimum amount via passage 191, including the control valve 193.

If it is desired to increase the temperature, the knob assembly 37 is turned further anticlockwise (Fig. 7), which has the effect of turning the tubular portion 17 and backing off the valve seat 19. This increases the travel required for closure of the thermostatic control valve 83, requiring a greater temperature of the liquid in tube 113 for the purpose. This results in a higher steady-state temperature at an increased rate of gas consumption due to the increased opening at valve 83 afforded by the backed-off seat 19. To turn the burner off, the knob assembly 37 is turned clockwise to its initial rotary position, whereupon the lug 51 aligns with its receiving opening in cup 45 and is pressed therein by spring 55. This returns the knob assembly 37 to its initial axial position. Valve 23 is then closed, which turns off the main burner.

If at any time the pilot light 173 becomes extinguished, the thermocouple 171 cools, which deenergizes the electromagnet 135, releasing the armature 133. The safety valve 123 then springs shut under action of spring 131. Likewise, the pilot safety valve 209 springs shut under action of the spring 211. This occurs regardless of the position of the knob assembly 37, and cuts off gas from both the main burner at the end of pipe 89 and the pilot burner 173 at the end of pipe 222. In order further to use the range, it must again be prepared by returning the knob assembly 37 to its initial rotary position and pushing it in and relighting the pilot as above described.

If it is desired to calibrate the temperature in the space being heated, the screw or screws 75 are loosened and the stem 69 turned with respect to the valve 23. This shifts the temperature range over which the valve 83 effects its controlling action.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A gas control and safety valve combination associated with main and pilot burners, said main burner being in a space to be heated, said burners being supplied with gas from a supply line; comprising a first gas connection between the line and the main burner, a cut-off valve, a thermostatic valve and a main safety valve in said connection, means controlling said thermostatic valve according to the temperature in said space, a rotary control assembly, means adapted to lock said control assembly in an initial position, said control assembly being movable axially from said initial position to unlock and thereafter rotatably to control the cut-off valve and to adjust the action of said thermostatic valve in response to temperature, an armature carried by said main safety valve, means biasing said safety valve with the armature toward a closed position of the valve, a second independent gas connection between said line and the pilot burner, a pilot safety valve in said second connection, means biasing said pilot safety valve toward a closed position, an electromagnet spaced from said armature, a thermocouple in heat-exchange relation with the pilot burner adapted to supply current to the electromagnet to hold the armature against the biasing means of the main safety valve when the armature is moved near the electromagnet, whereby said main safety valve will be held open by the armature when the pilot burner is ignited, said main and pilot safety valves being movable substantially at right angles to one another, a first push rod engageable by and upon axial movement of said control assembly from locked position by an amount more than required merely for unlocking adapted to open the main safety valve and to apply said armature to the electromagnet, and a second push rod adapted to operate the pilot safety valve, cam means on said first push rod and adapted substantially simultaneously to move the second push rod to open the pilot safety valve when the main safety valve is opened, said control assembly after axial movement from locked position by an amount less than required for operation of said push rod being rotary for temperature control adjustments of said thermostatic valve, said first push rod being adapted to permit the return of said control assembly to its initial locked position whether or not the first push rod is in open or closed positions of said safety valves.

2. A gas control and safety valve combination associated with main and pilot burners, said burners being supplied with gas from a supply line; comprising a first gas connection between the line and the main burner, a main safety valve in said connection, said valve having an armature and being movable therewith in one direction, means biasing said valve with the armature in a reverse direction toward a closed position of the safety valve, a second gas connection between said line and the pilot burner, a pilot safety valve in said second connection and movable at right angles to the motion of said main safety valve, means biasing said safety valve toward main safety valve, means biasing said safety valve toward a closed position, a first stem movable in one direction for operating the main safety valve, a second stem movable crosswise of the first stem for operating the pilot safety valve, cam means connecting said stems comprising a shoulder on the first stem engageable with one end of the second stem, whereby said pilot safety valve is opened in response to opening movement of the main safety valve, at least one control valve in said first connection, a control assembly having a first partial movement axially from an initial locked position to an unlocked position for rotation and having a second additional axial movement for operation of said first stem, the thermocouple means in heat-exchange relation with a pilot burner adapted to hold said armature and main safety valve in a holding position, said control assembly being cooperative with said first stem during said second additional movement to open said safety valves and to place said armature in said holding position, said control assembly being adapted for rotation after its first partial axial movement to operate said control valve regardless of the position of said first stem.

References Cited in the file of this patent

UNITED STATES PATENTS

| | | |
|---|---|---|
| 2,483,191 | Gauger | Sept. 27, 1949 |
| 2,557,927 | Abrams | June 26, 1951 |
| 2,596,796 | Solovieff | May 13, 1952 |
| 2,690,873 | Vaughn | Oct. 5, 1954 |
| 2,695,056 | Caprone | Nov. 23, 1954 |
| 2,707,517 | Strobel | May 3, 1955 |